United States Patent
van den Berg et al.

(10) Patent No.: US 7,430,474 B2
(45) Date of Patent: Sep. 30, 2008

(54) REMOVING SEA SURFACE-RELATED ELECTROMAGNETIC FIELDS IN PERFORMING AN ELECTROMAGNETIC SURVEY

(75) Inventors: Peter M. van den Berg, RV Pinjacker (NL); Aria Abubakar, Danbury, CT (US); Tarek Habashy, Danbury, CT (US)

(73) Assignee: Schlumberger Technology Corporation, Houston, TX (US)

( * ) Notice: Subject to any disclaimer, the term of this patent is extended or adjusted under 35 U.S.C. 154(b) by 17 days.

(21) Appl. No.: 11/554,857

(22) Filed: Oct. 31, 2006

(65) Prior Publication Data

US 2008/0103700 A1    May 1, 2008

(51) Int. Cl.
*G01V 3/17* (2006.01)
(52) U.S. Cl. .......................... 702/2; 324/337
(58) Field of Classification Search .............. 702/2, 702/6, 7; 324/337, 347, 348, 365
See application file for complete search history.

(56) References Cited

U.S. PATENT DOCUMENTS

| 4,617,518 A | 10/1986 | Srnka |
| 4,633,182 A | 12/1986 | Dzwinel |
| 6,628,119 B1 | 9/2003 | Eidesmo et al. |

FOREIGN PATENT DOCUMENTS

| GB | 2070345 | 9/1981 |
| GB | 2412739 | 10/2005 |
| GB | 2412740 | 10/2005 |
| WO | WO0214906 | 2/2002 |
| WO | WO2003100467 | 12/2003 |
| WO | WO2005096019 | 10/2005 |
| WO | WO2006000538 | 1/2006 |

OTHER PUBLICATIONS

Boerner, David E. et al., Orthogonality in CSAMT and MT Measurements, Geophysics, vol. 58, No. 7, Jul. 1993, pp. 924-934.
Chave, Alan D. et al., Controlled Electromagnetic Sources for Measuring Electrical Conductivity Beneath the Oceans, Journal of Geophysical Research, vol. 87, No. B7, pp. 5327-5338, Jul. 10, 1982.
Chave, Alan D. et al., Electrical Exploration Methods in Applied Geophysics vol. 2, Electrical Exploration Methods for the Seafloor, Chapter 12, 1991, pp. 931-966.

(Continued)

*Primary Examiner*—Edward Raymond
(74) *Attorney, Agent, or Firm*—Dan C. Hu; Liangang (Mark) Ye; Jeffrey E. Griffin

(57) ABSTRACT

To perform surveying of a subterranean structure, electromagnetic (EM) wavefields traveling in opposite directions are determined. A relationship is defined among the EM wavefields, where the EM wavefields include a first set of EM wavefields in a first state in which a sea surface is present, and a second set of EM wavefields in a second, different state in which the sea surface is not present. At least one EM wavefield in the relationship is determined to perform removal of sea surface-related effects.

16 Claims, 3 Drawing Sheets

OTHER PUBLICATIONS

Constable, S. et al., Marine Controlled-Source Electromagnetic Sounding, Journal of Geophysical Research, vol. 101, No. B3, Mar. 10, 1996, pp. 5519-5530.

Constable, S. et al., Occam's Inversion: A Practical Algorithm for Generating Smooth Models from Electromagnetic Sounding Data, Geophysics, vol. 52, No. 3, Mar. 1987, pp. 289-300.

Edwards, R. Nigel, On the Resource Evaluation of Marine Gas Hydrate Deposits Using Sea-Floor Transient Electric Dipole-Dipole Methods, Geophysics vol. 62, No. 1, Jan.-Feb. 1997, pp. 63-74.

Edwards, R.N., Controlled Source Electromagnetic Mapping of the Crust, Encyclopedia of Solid Earth Geopysics, ed. James D. Van Nostrand Reinhold, New York, 1989, pp. 127-138.

Yuan, J. et al., Electromagnetic Assessment of Offshore Methane Hydrate Deposits on the Cascadia Margin, American Geophyiscal Union Fall Meeting, San Francisco, 1998, pp. 363-375.

Kearey, Philip, The Encyclopedia of the Solid Earth Sciences, Blackwell Scientific Publications, 4 pages.

Evans, Rob L. et al., On the Electrical Nature of the Axial Melt Zone at 13 Degrees N on the East Pacific Rise, Journal of Geophysical Research, vol. 99, No. B1, Jan. 10, 1994, pp. 577-588.

Flosadottir, A. et al., Marine Controlled-Source Electromagnetic Sounding, Journal of Geophysical Research, vol. 101, No. B3, Mar. 10, 1996, pp. 5507-5517.

U.S. Dept. of Energy Office of Basic Energy Sciences, Division of Engineering and Geosciences, Two and Three-Dimensional Magnetotelluric Inversion, Technical Report: Dec. 1, 1991-May 31, 1994.

Grant, I.S. et al., Electromagnetism, Second Edition, John Wiley & Sons, 5 pages.

Kaufman, A. et al., Methods in Geochemistry and Geophysics, 16, 18 pages.

Kvenvolden, K. et al., A Primer on the Geological Occurrence of Gas Hydrate, Gas Hydrates: Relevance to World Margin Stability and Climate Change, Geological Society, London, Special Publications, 137, 9-30.

Macgregor, L. et al., The RAMESSES Experiment-III. Controlled-Source Electromagnetic Sounding of the Reykjanes Ridge . . . , Geophys. J. Int. 1998, 135, pp. 773-789.

Macgregor, L. et al., Use of Marine Controlled Source Electromagnetic Sounding for Sub-Basalt Exploration, EAGE 61st Conference and Technical Exhibition, Helsinki, Finland, Jun. 7-11, 1999.

Nekut, A. et al., Petroleum Exploration Using Controlled-Source Electromagnetic Methods, Proceedings of the IEEE, vol. 77, No. 2, Feb. 1989, 13 pages.

Sinha, M. C. et al., Evidence for Accumulated Melt Beneath the Slow-Spreading Mid-Atlantic Ridge, Phil. Trans. R. Soc. Land. A, 355, 1997, pp. 233-253.

Sinha, Martin, Controlled Source EM Sounding: Survey Design Considerations for Hydrocarbon Applications, LITHOS Science Report Apr. 199, 1, 95-101.

Sinha, M. et al., An Active Source Electromagnetic Sounding System for Marine Use, Marine Geophysical Researches 1990, 12: 59-68.

Strack, K. et al., Integrating Long-Offset Transient Electromagnetic (LOTEM) with Seismics in an Exploration Environment, Geophysical Prospecting, 1996, 44, 997-1017.

Tseng, H. et al., A Borehole-to-Surface Electromagnetic Survey, Geophysics vol. 63, No. 5, pp. 1565-1572.

Das, Umesh C., Apparent Resistivity Curves in Controlled-Source Electromagnetic Sounding Directly Reflecting True Resistivities in a Layered Earth, Geophysics vol. 60, No. 1, Jan.-Feb. 1995, pp. 53-60.

Das, Umesh C., Frequency- and Time-Domain Electromagnetic Responses of Layered Earth-A Multiseparation, Multisystem Approach, Geophysics vol. 60, No. 1, Jan.-Feb. 1995, pp. 285-290.

Thompson, Arthur H. et al., U.S. Statutory Invention Registration H1490, Sep. 5, 1995.

Walker, Peter W. et al., Parametric Estimators for Current Excitation on a Thin Plate, Geophysics vol. 57, No. 6, Jun. 1992, pp. 766-773.

Ward, S.H. et al., Electromagnetic Theory for Geophysical Applications, in Investigations in Geophysics: Electromagnetic Methods in Applied Geophysics, ed. Nabighian, Society of Exploration Geophysicists, Oklahoma, 1988, 10 pages.

Yuan, J. et al., The Assessment of Marine Gas Hydrates through Electrical Remote Sounding: Hydrate without a BSR?, Geophysical Research Letters, vol. 27, Aug. 2000, pp. 2397-2400.

Yuan, Edwards et al., Electromagnetic Assessment of Offshore Methane Hydrate Deposits on the Cascadia Margin, Marelec 1999, 12 pages.

Maurer, Hansruedi et al., Optimized Design of Geophysical Experiments, SEG Paper.

Grant, I.S. et al., Electromagnetic Waves, Chapter 11, pp. 365-407.

Young, P.D. et al, Electromagnetic Active Source Sounding Near the East Pacific Rise, Geophysical Research Letters, vol. 8, 1981, pp. 1043-1046.

Sinha, M.C. et al., An Active Source Electromagnetic Sounding System for Marine Use, Marine Geophysical Research, 1990, vol. 12, p. 29-68, 10 pages.

Constable, S.C. et al., Marine Controlled Source Electromagnetic Sounding II: The PEGASUS Experiment, Journal of Geophysical Research, vol. 1001, 1998, pp. 5519-5530.

Macgregor, L.M. et al., The RAMESSUS Experiment-III, Controlled Source Electromagnetic Sounding of the Reykjanes Ridge at 57°45'N, Geophysical Journal International vol. 135, 1998, pp. 773-789.

Eidemo, T. et al., How Electromagnetic Sounding Technique Could be Coming to Hydrocarbon E&P, First Break, vol. 20.3, 2002, pp. 142-143.

Eidemo, T. et al., Sea Bed Logging (SBL), A New Method for Remote and Direct Identification of Hydrocarbon Filled Layers in Deepwater Areas, First Break, vol. 20.3, 2002, pp. 144-152.

Ellingsrud, T. et al., Remote Sensing of Hydrocarbon Layers by Sea Bed Logging (SBL): Results from a Cruise Offshore Angola, The Leading Edge, 2002, pp. 972-982.

Rosten, T. et al., Generalized Electromagnetic Seabed Logging Wavefield Decomposition into U/D-Going Components, SEG Expanded Abstracts, vol. 23, 2004, pp. 600-603.

Amundsen, L. et al., Decomposition of Electromagnetic Waves Into Upgoing and Downgoing Components, Geophysics, vol. 71, No. 5, Sep.-Oct. 2006, pp. G211-G223.

Fokkema, J.T. et al., Seismic Applications of Reciprocity, Elsevier, 1993, 7 pages.

De Hoop, A.T. et al., Handbook of Radiation and Scattering of Waves, Academic Press, London, 1995, 15 pages.

REMOVING SEA SURFACE-RELATED ELECTROMAGNETIC FIELDS IN PERFORMING AN ELECTROMAGNETIC SURVEY

TECHNICAL FIELD

The invention relates generally to removing sea surface-related electromagnetic fields in performing an electromagnetic survey, such as a controlled source electromagnetic survey.

BACKGROUND

Various electromagnetic techniques resist to perform surveys of subterranean structures underneath a surface for identifying structures of interest. Examples of structures of interest in the subterranean structure include subsurface resistive bodies, such as oil-bearing reservoirs, gas injection zones, and fresh-water aquifers. One survey technique is the controlled source electromagnetic (CSEM) survey technique, in which an electromagnetic (EM) transmitter (typically towed by a sea vessel in a marine environment) is used to generate electromagnetic signals. Surveying units (or receivers) containing electric and magnetic field sensors are deployed on the sea floor within an area of interest to make measurements (of EM wavefields) from which a geological survey of the subterranean structure underneath the surface can be derived.

Through the use of the CSEM technique, a high-resolution mapping of changes in resistivity associated with the presence of oil and hydrocarbon is possible. Measurements taken by the EM receivers are interpreted in such a way that a prediction of the presence and location of oil and hydrocarbon in the sedimentary layers of the subterranean structure can be made.

In a shallow water environment, ghosting and water-layer multiple reflections can occur due to the presence and proximity of the air-water interface to the surveying units. Ghosting and water-layer multiple reflections arise because water has a substantially different resistivity from the air above the water surface. Furthermore, water typically has a substantially different resistivity from the earth formations underneath the sea floor. When an EM transmitter located in sea water is activated, the downwardly radiating EM energy from the EM transmitter passes through the sea floor and into the subterranean structure. Some of the EM energy is reflected by resistivity changes of certain layers in the subterranean structure. The reflected EM energy (in the form of reflected EM signals) travels generally upwardly through the subterranean structure, and is ultimately detected by EM receivers at the sea floor. After the reflected signal reach these receivers, the reflected signals continue to travel upwardly through the sea water until they reach the sea surface. The sea surface reflects a large part of the upwardly traveling EM signals. Therefore, a substantial part of the upwardly traveling EM signals will reflect back from the sea surface, and travel downwardly once again.

The sea surface reflected downwardly traveling EM signals would also be shifted in phase from the upwardly traveling EM signals. A surface-reflected, downwardly traveling EM signal is commonly referred to as a "ghost" signal. Ghost signals are also measured by the receivers at the sea floor. In addition, downwardly traveling EM signals, whether reflected from the sea surface or transmitted directly by the EM transmitter source, may also reflect from the sea floor and travel back upwardly. EM signals traveling between the sea surface and the sea floor may reflect from both the sea surface and the sea floor a number of times before such signals are attenuated. The multiple reflections of EM signals by the sea surface and sea floor result in the EM receivers detecting multiple versions of the same signals (resulting in the water-layer multiple reflections phenomenon). These reverberations (that cause ghosting and water-layer multiple reflections) can have substantial amplitudes within the total EM fields measured by the receivers, which can cause masking of field signals that are reflected from subterranean structures. The presence of ghosting and multiple reflections make it difficult to accurately identify subterranean structures and compositions based on collected CSEM survey data.

SUMMARY

In general, methods and apparatus are provided to remove sea surface-related electromagnetic fields when performing an electromagnetic survey of a subterranean structure underneath a sea floor.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
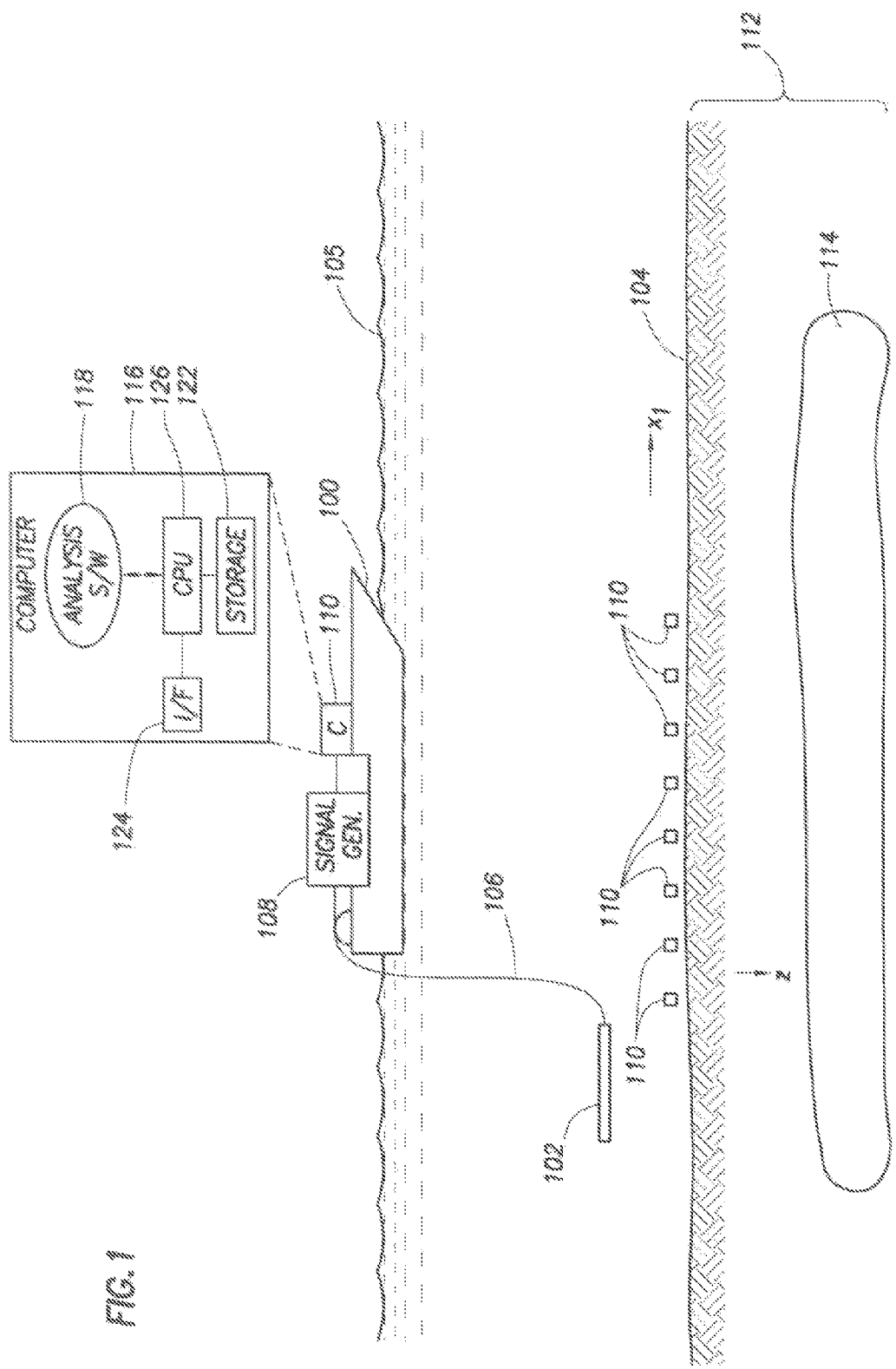
FIG. 1 schematically illustrates an example arrangement for performing a survey of a subterranean structure underneath a seabed or sea floor in a subsea or marine environment.

FIG. 1 illustrates an example arrangement for performing a survey of a subterranean structure in a subsea environment. As will be described in further detail below, the subterranean structure surveying performed in accordance with some embodiments uses measurements received according to a controlled source electromagnetic (CSEM) survey technique. With the CSEM survey technique, an EM transmitter (102 in FIG. 1) generates EM signals that propagate or diffuse through various layers, including the sea water and layers in the subterranean structure, which EM signals are reflected by the subterranean layers back up to the receivers located on the surface (in this case the seabed or sea floor 104). in FIG. 1, receivers are depicted as sensor modules 110 located on or near the seabed 104. The sensor modules 110 are used to measure the EM signals reflected from the subterranean layers.

Each sensor module 110 may be able to measure both the tangential (horizontal) electric fields and the tangential (horizontal) magnetic fields. The tangential (horizontal) electric fields and magnetic fields refer to field vectors that are generally parallel to the seabed 104. The electrical and magnetic field measurements are processed using EM data processing, from which subterranean structures can be analyzed to determine if the subterranean structures contain subsurface resistive bodies, such as oil-bearing reservoirs, gas injection zones, or fresh-water aquifers.

In the following discussion, reference is made to three directions: $x_1$, $x_2$, and $x_3$. The $x_1$ and $x_2$ directions are perpendicular to each other and are generally parallel to the seabed 104, and the $x_3$ direction is perpendicular to both the $x_1$ and $x_2$ directions and extends in a generally vertical direction (generally perpendicular to the seabed 104).

The tangential electric and magnetic fields measured by each sensor module 110 is based on EM wavefields that travel in the vertical (or $x_3$) direction. As noted above, an issue associated with presence of the sea surface 105, particularly in a shallow water environment, is ghosting and multiple reflections.

A technique for performing deghosting is to decompose EM fields into an up-going (upwardly traveling) EM wavefield and a down-going (downwardly traveling) EM wavefield. Note that the term "EM wavefield" refers generally to EM energy propagating or diffusing through any of sea water or subterranean structure. The EM wavefield that is of interest is the up-going EM wavefield, which is the EM wavefield that is reflected from subterranean layers back up to the sensor modules 110.

Down-going EM wavefields are caused by reflections from the sea surface 105, and thus are not of interest for performing a survey of subterranean layers.

However, although decomposing EM wavefields into up-going and down-going EM wavefields allows for deghosting, the up-going EM wavefield measured by the sensor modules still contains reverberations, which are also known as multiples (or water-layer multiples) that are caused by reflections between the sea surface 105 and the seabed 104 that occur multiple times until EM wavefields have been attenuated by the sea water.

An example technique is provided to remove water-layer multiples in signals acquired by the sensor modules 110. The example technique may enable multiple removals that are relatively insensitive to the sea depth and the earth geology below the seabed 104. Also, the technique for removing water-layer multiples can be accomplished without knowing the source wavelet (EM signature) produced by the EM transmitter 102 beforehand. Thus, an EM processing technique for performing CSEM survey measurements may enable the removal of sea surface-related multiples without a priori knowledge of the EM source wavelet.

According to some embodiments, the algorithm for the EM processing technique is based on application of the EM reciprocity theorem. The EM reciprocity theorem relates EM fields in an actual measurement configuration that includes the sea surface 105 with EM fields in a desired (or ideal) configuration without presence of the sea surface (by extending the water-layer medium or sea surface to infinity). The relationship between EM fields in the actual measurement configuration and the EM fields in the desired (or ideal) configuration is used to solve for an EM field representing the EM signals reflected from subterranean structures with ghosting and multiple reflections effects removed.

As further depicted in the subsea arrangement of FIG. 1, a sea vessel 100 is capable of towing the EM transmitter 102 in sea water. Typically, the EM transmitter 102 is arranged a relatively short distance above the seabed 104. As examples, the relatively short distance of the transmitter 102 above the seabed 104 can be 50 meters or less. Although only one EM transmitter 102 is depicted, it is contemplated that alternative embodiments may use two or more EM transmitters 102.

The EM transmitter 102 is coupled by a cable 106 to a signal generator 108 on the sea vessel 100. Alternatively, the signal generator 108 can be contained within the EM transmitter 102. The signal generator 108 controls the frequency and magnitude of the EM signal generated by the transmitter 102.

In one example, a plurality of sensor modules 110 are arranged on the seabed 104 in a row (in a direction depicted as $x_1$). In other embodiments, the sensor modules 110 can have other arrangements (such as an array of sensor modules or some random arrangement of sensor modules). Each sensor module 110 includes various sensors, including electric field sensors and magnetic field sensors for making electric field measurements and magnetic field measurements, respectively. Each of the sensor modules 110 depicted in FIG. 1 provides measurement data (CSEM measurement data), where the measurement data corresponds to measurements at plural points along a line (row in direction $x_1$ as depicted in FIG. 1).

In one example, each of the sensor modules 110 includes a storage device for storing measurements made by the various sensors, including electric field and magnetic field sensors, in the sensor module 110. The stored measurement data is retrieved at a later time when the sensor modules 110 are retrieved to the sea vessel 100. The retrieved measurement data can be uploaded to a computer 116 on the sea vessel 100, which computer 116 has analysis software 118 capable of analyzing the measurement data for the purpose of creating a map of the subterranean structure 112. The analysis software 118 in the computer 116 is executable on a central processing unit (CPU) 120 (or plural CPUs), which is coupled to a storage 122. An interface 124 that is coupled to the CPU 120 is provided to allow communication between the computer 116 and an external device. For example, the external device may be a removable storage device containing measurement data measured by the sensor modules 110. Alternatively, the interface 124 can be coupled to a communications device for enabling communications of measurement data between the computer 116 and the sensor modules 110, where the communications can be wired communications or wireless communications. The wired or wireless communications can be performed when the sensor modules 110 have been retrieved to the sea vessel 100. Alternatively, the wired or wireless communications can be performed while the sensor modules 110 remain on the sea floor 104.

Alternatively, instead of providing the computer 116 (and the analysis software 118) on the sea vessel 100, the computer 116 can instead be located at a remote location (e.g., at a land location). The measurement data from the sensor modules 110 can be communicated by a wireless link (e.g., satellite link) from the sea vessel 100 to the remote location. In yet another alternative, each sensor module 110 can include processing circuitry to process the measurement data and derive electric field values in accordance with some embodiments.

Figure 2:
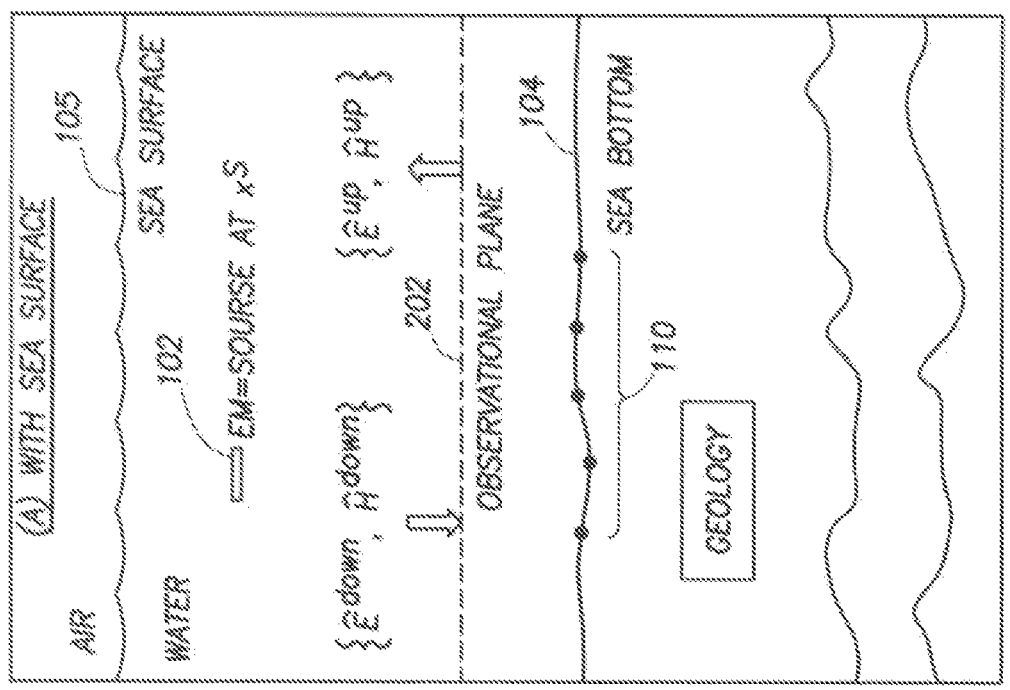
FIG. 2 illustrates an example of downwardly traveling and upwardly traveling electromagnetic wavefields when a sea surface is present.

An EM wavefield in space and time is denoted as $\{E(x,t), H(x,t)\}$, with spatial coordinates $x = \{x_1, x_2, x_3\}$ and time coordinate t. $E(x,t)$ represents the electric field, while $H(x,t)$ represents the magnetic field. The coordinates $\{x_1, x_2\}$ denote the horizontal directions (directions generally parallel to the seabed 104), while $x_3$ denotes the vertical direction pointing into the earth (or generally perpendicular to seabed 104). The EM wavefield is generated by the electromagnetic transmitter 102 located in the sea at spatial position $x^S = \{x_1^S, x_2^S, x_3^S\}$, as depicted in FIG. 2. On the seabed 104, the EM wavefield reflected by the earth geology is measured by sensor modules 110. It is assumed that there exists a hypothetical observational (horizontal) plane 202 (FIG. 2) between the source level (the level of the transmitter 102) and the seabed 104. The vertical coordinate of this observational plane is given by $x_3^{obs}$.

In the ensuing discussion, the EM field quantities in the frequency domain, denoted as $\{\hat{E}(x), \hat{H}(x)\}$, are considered, where the symbol ^ denotes the dependence on the frequency parameter ω (the frequency of the EM signals produced by the EM transmitter 102). It is also assumed that the seawater is homogeneous (within the resolution of the measurement). The material parameters of the subterranean structure underneath the seabed 104 are denoted by the complex constant permittivity $$\hat{\varepsilon} = \varepsilon - \frac{\sigma}{j\omega},$$

and the real constant permeability μ. Here, ε is the dielectric permittivity of the subterranean structure σ is the electrical conductivity of the subterranean structure, and j is an imaginary unit.

At the observation plane 202, the EM wavefield can be decomposed into up-going and down-going wavefields. In the frequency domain, these wavefields are denoted as $\{\hat{E}^{up}(x), \hat{H}^{up}(x)\}$ and $\{\hat{E}^{down}(x), \hat{H}^{down}(x)\}$, respectively, as shown in FIG. 2.

Figure 3:
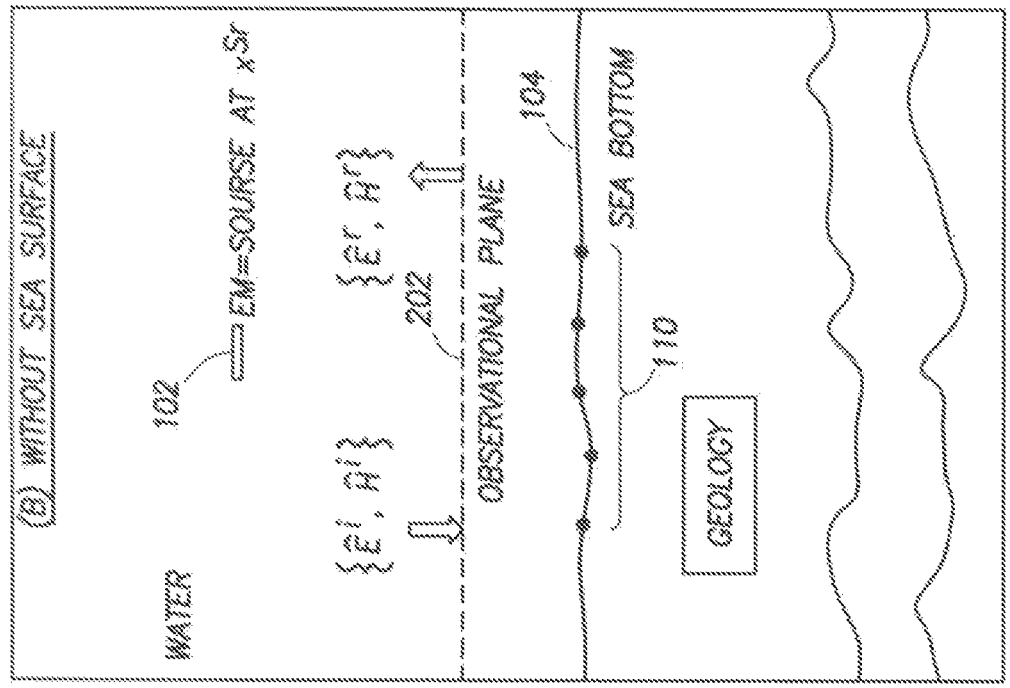
FIG. 3 illustrates an example of downwardly traveling and upwardly traveling electromagnetic wavefields when the sea surface is not present.

As mentioned above, a technique for removing water-layer multiples may utilize the EM reciprocity theorem, which relates EM fields in the actual measurement configuration (that includes the sea surface 105) with EM fields in a desired configuration (without the presence of the sea surface). One example of an actual measurement configuration is depicted in FIG. 2, while the desired configuration is depicted in FIG. 3. EM fields measured in the two different configurations are referred to as Em fields in two different EM field states, where a first state correspond to EM fields measured in the actual configuration (state A), and the second state corresponds to EM fields measured in the desired configuration (state B).

The two electromagnetic field states are considered in the domain below the observational plane 202. Since there are no EM sources below this observational plane 202 and assuming that the earth geology is the same in both field states, the EM field reciprocity theorem applied to this domain yields, in the observational plane 202, the following reciprocity relation:

$$\iint\limits_{(x_1,x_2)\in R^2} i_3 \cdot [\hat{E}^A \times \hat{H}^B - \hat{E}^B \times \hat{H}^A] dA = 0, \qquad \text{(Eq. 1)}$$

where $\{\hat{E}^A(x), \hat{H}^A(x)\}$ and $\{\hat{E}^B(x), \hat{H}^B(x)\}$ represent EM fields in two field states (corresponding to the actual configuration and desired configuration of respective FIGS. 2 and 3) at the observational plane $x=\{x_1, x_2, x_3^{obs}\}$. The vector $i_3$ is the unit vector in the vertical direction $x_3$. $R^2$ denotes the two-dimensional domain of the observational plane 202. By using the decomposition of the electromagnetic fields in states A and B into up- and down-going wavefields and noting that only wavefields traveling in the opposite directions contribute, Eq. 1 can be rewritten as follows:

$$\iint\limits_{(x_1,x_2)\in R^2} i_3 \cdot [\hat{E}^{A,up} \times \hat{H}^{B,down} - \hat{E}^{B,down} \times \hat{H}^{A,up} + \qquad \text{(Eq. 2)}$$

$$\hat{E}^{A,down} \times \hat{H}^{B,up} - \hat{E}^{B,up} \times \hat{H}^{A,down}] dA = 0.$$

It is observed that, in the integrated of Eq. 2, the second term ($\hat{E}^{B,down} \times \hat{H}^{A,up}$) is equal to the first term ($\hat{E}^{A,up} \times \hat{H}^{B,down}$) and the fourth term ($\hat{E}^{B,up} \times \hat{H}^{A,down}$) is equal to the third term ($\hat{E}^{A,down} \times \hat{H}^{B,up}$). Hence, it may be concluded that at the observational plane 202 there is reciprocity between up- and down-going wavefields through the relations:

$$\iint\limits_{(x_1,x_2)\in R^2} i_3 \cdot [\hat{E}^{A,up} \times \hat{H}^{B,down}] dA = \qquad \text{(Eq. 3)}$$

$$\iint\limits_{(x_1,x_2)\in R^2} i_3 \cdot [\hat{E}^{B,up} \times \hat{H}^{A,down}] dA,$$

or $$\iint\limits_{(x_1,x_2)\in R^2} i_3 \cdot [\hat{E}^{A,down} \times \hat{H}^{B,up}] dA = \qquad \text{(Eq. 4)}$$

$$\iint\limits_{(x_1,x_2)\in R^2} i_3 \cdot [\hat{E}^{B,down} \times \hat{H}^{A,up}] dA.$$

The relations expressed in Eqs. 3 and 4 are the propagation/diffusion invariants for up- and down-going wavefields, which form the basis for the removal of sea-surface multiples and the source ghost. These two relations are not independent of each other. One can use either the first relation (Eq. 3) or the second relation (Eq. 4). In the ensuing discussion, the relation of Eq. 3 is utilized.

State A includes a down-going wavefield $\{\hat{E}^{down}(x), \hat{H}^{down}(x)\}$ and an up-going wavefield $\{\hat{E}^{up}(x), \hat{H}^{up}(x)\}$. These down- and up-going wavefields were determined from pre-processing base don measurement data from a survey module 110. The down-going wavefield in state A includes the direct wavefield generated by the EM source as well as down-going wavefields reflected from the sea surface 105. In state A, the up-going wavefield includes the target up-going reflected wavefield (which is the wavefield reflected from the subterranean structure) as well as up-going reflected signals from the seabed 104.

In state B (the desired configuration), the sea surface 105 has been removed and the sea water layer has been extended to infinity (see FIG. 3). At the observational plane 202, a desired wavefield is represented as a superposition of a down-going incident wavefield $\{\hat{E}^i(x), \hat{H}^i(x)\}$, generated directly by the EM transmitter 102, and an up-going reflected wavefield $\{\hat{E}^r(x), \hat{H}^r(x)\}$, reflected from subterranean layers. With the above definitions, Eq. 5 below is obtained from Eq. 3 as follows:

$$\iint\limits_{(x_1,x_2)\in R^2} i_3 \cdot [\hat{E}^{up} \times \hat{H}^i] dA = \iint\limits_{(x_1,x_2)\in R^2} i_3 \cdot [\hat{E}^r \times \hat{H}^{down}] dA, \qquad \text{(Eq. 5)}$$

where $\hat{E}^{up}$ represents the up-going electric field in state A, $\hat{H}^i$ replaces $\hat{H}^{B,down}$, $\hat{E}^r$ replaces $\hat{E}^{B,up}$, and $\hat{H}^{down}$ represents the down-going magnetic field in state A.

To indicate the different source positions $x^S$ of the actual wavefield and the different source positions $x^{Sr}$ of the desired wavefield, Eq. 5 is written as:

$$\iint\limits_{(x_1,x_2) \in R^2} i_3 \cdot [\hat{E}^{up}(x|x^S) \times \hat{H}^i(x|x^{Sr})]dA = \quad \text{(Eq. 6)}$$

$$\iint\limits_{(x_1,x_2) \in R^2} i_3 \cdot [\hat{E}^r(x|x^{Sr}) \times \hat{H}^{down}(x|x^S)]dA,$$

where $x = \{x_1, x_2, x_3^{obs}\}$, $x^S = \{x_1^S, x_2^S, x_3^S\}$ and $x^{Sr} = \{x_1^{Sr}, x_2^{Sr}, x_3^{Sr}\}$, in which $x_3^{obs}$ is the vertical location of the observational plane, $x_3^S$ is the vertical location of the actual source, and $x_3^{Sr}$ is the vertical location of the desired source. Note that Eq. 6 involves only the horizontal components of the electric and magnetic field vectors.

In one example, to solve Eq. 6 to obtain the up-going reflected wavefield (without presence of ghosting and multiples), measurements are taken with the sensor module 110 for a number of source positions $x^S$ above the area of investigation. Further, the integration of Eq. 6 is replaced by a finite summation, which leads to a system of equations. In the system of equations, for one source position $x^{Sr}$, the horizontal components of $\hat{E}^r(x|x^{Sr})$ are the unknown, while the horizontal components of $\hat{E}^{up}(x|x^S)$, $\hat{H}^i(x|x^{Sr})$ and $\hat{H}^{down}(x|x^S)$ are known. $\hat{E}^{up}(x|x^S)$ and $\hat{H}^{down}(x|x^S)$ are obtained from the decomposition of the actual wavefields (derived based on measured EM fields by sensor modules) into up- and down-going wavefields, while $\hat{E}^i(x|x^{Sr})$ is a prescribed incident wavefield that would produce the desired reflected wavefield. Further, since Eq. 6 is a scalar equation, while the unknown is a two-component vector field including the two horizontal components of the electric field vector $\hat{E}^r(x|x^{Sr})$, a set of measurements using two different source orientations (referred to as orientations I and II) at $x^S$ are used. For example, the two orientations (or excitations) can be provided by an electric dipole located in two horizontal directions. In an alternative implementation, orientation (or excitation) I and orientation (or excitation) II can refer to two different EM transmitters (e.g., a vertical electronic dipole source and a vertical magnetic dipole source).

The terms "orientation" and "excitation" are used to connote either a particular orientation of a single source or a particular type of source. From the above, the following system of equations is obtained:

$$\iint\limits_{(x_1,x_2) \in R^2} i_3 \cdot [\hat{E}^{up,I}(x|x^S) \times \hat{H}^i(x|x^{Sr})]dA = \quad \text{(Eq. 7A)}$$

$$\iint\limits_{(x_1,x_2) \in R^2} i_3 \cdot [\hat{E}^r(x|x^{Sr}) \times \hat{H}^{down,I}(x|x^S)]dA,$$

-continued $$\iint\limits_{(x_1,x_2) \in R^2} i_3 \cdot [\hat{E}^{up,II}(x|x^S) \times \hat{H}^i(x|x^{Sr})]dA = \quad \text{(Eq. 7B)}$$

$$\iint\limits_{(x_1,x_2) \in R^2} i_3 \cdot [\hat{E}^r(x|x^{Sr}) \times \hat{H}^{down,II}(x|x^S)]dA,$$

for all $x^2 \in R^2$.

In the above equations, $\hat{E}^{up,I}(x|x^S)$ represents the $\hat{E}^{up}(x|x^S)$ wavefield for the transmitter at orientation I, and $\hat{E}^{up,II}(x|x^S)$ represents the $\hat{E}^{up}(x|x^S)$ wavefield with the transmitter 102 at orientation II. The $\hat{H}^{down,I}$ and $\hat{H}^{down,II}$ wavefields similarly represent magnetic wavefields at respective orientations I and II. After discretization of the integrals in Eqs. 7A-7B, a discrete set of equations for the horizontal components of the desired electric field $\hat{E}^I(x|x^{Sr})$ are obtained for a discrete set of x-points and for one specific value of the source point $x^{Sr}$.

The time domain version of Eqs. 7A and 7B can be converted into:

$$\int_{t' \in R} dt' \iint\limits_{(x_1,x_2) \in R^2} i_3 \cdot [E^{up,I}(x|x^S, t-t') \times H^i(x|x^{Sr}, t')]dA = \quad \text{(Eq. 8A)}$$

$$\int_{t' \in R} dt' \iint\limits_{(x_1,x_2) \in R^2} i_3 \cdot [E^r(x|x^{Sr}, t') \times H^{down,I}(x|x^S, t-t')]dA$$

$$\int_{t' \in R} dt' \iint\limits_{(x_1,x_2) \in R^2} i_3 \cdot [E^{up,II}(x|x^S, t-t') \times H^i(x|x^{Sr}, t')]dA = \quad \text{(Eq. 8B)}$$

$$\int_{t' \in R} dt' \iint\limits_{(x_1,x_2) \in R^2} i_3 \cdot$$

$$[E^r(x|x^{Sr}, t') \times H^{down,II}(x, x^S, t-t')]dA$$

for all $x^s \in R^2$ and $t \in R$.

The above equations can be solved to derive the desired reflected wavefield $E^r(x|x^{Sr},t)$. Alternatively, Eq. 7 can be solved in the frequency domain (as explained further below). After solving the system of equations either in the frequency domain or in the time domain, desired multiple-free wavefield data (representing the up-going reflected wavefield $E^r(x|x^{Sr},t)$ is obtained).

Note that both in the frequency domain and in the time domain, a priori knowledge of the actual source signature (in the incident wavefield) is not needed. Instead, the type of incident wavefield in the desired configuration may be freely chosen.

Figure 4:
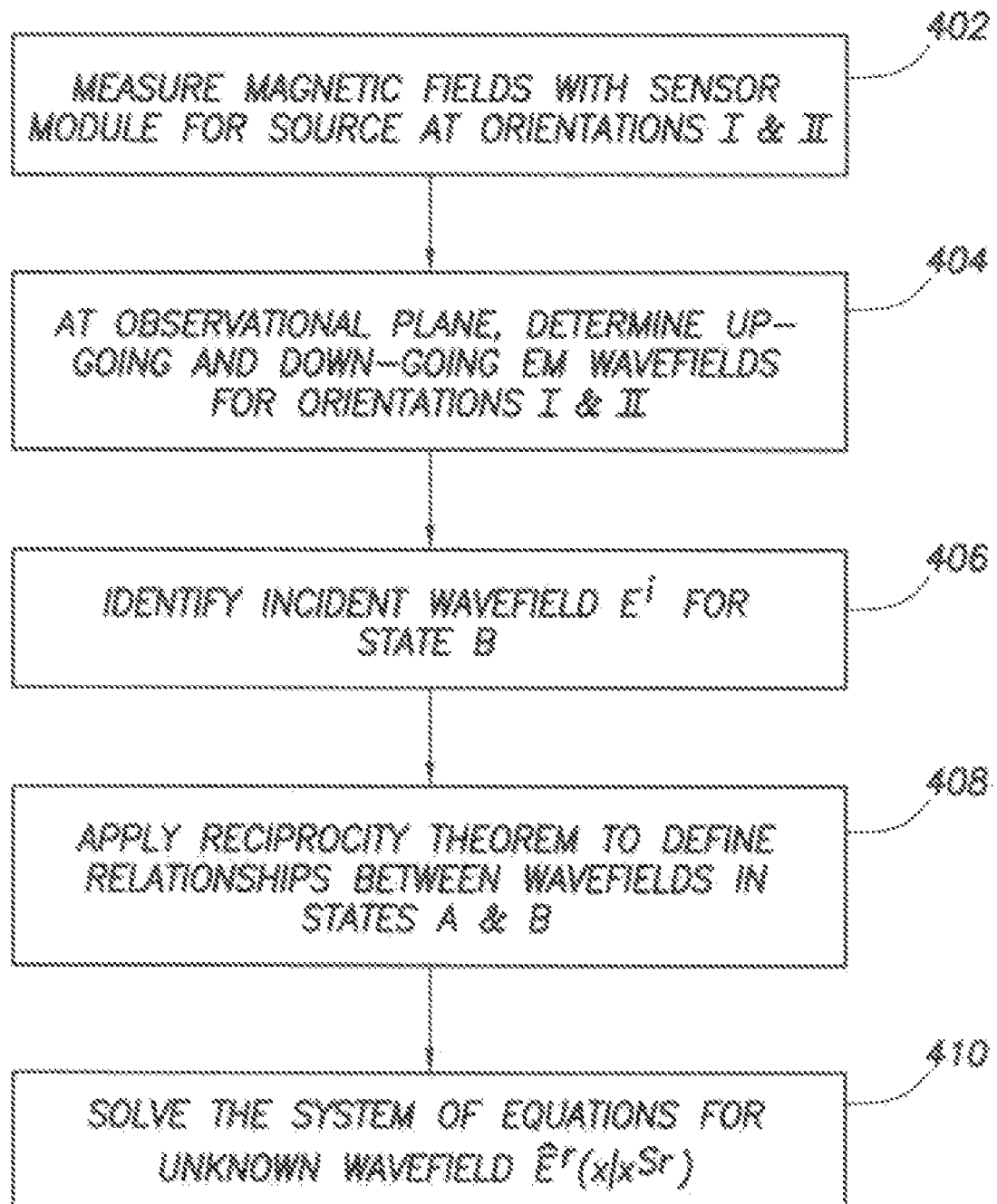
FIG. 4 is a flow diagram of an example process of performing an electromagnetic survey.

FIG. 4 shows an example of a procedure performed by the analysis software 118 in accordance with an embodiment to determine a wavefield reflected from a subterranean structure, where the wavefield is free of ghosting and sea surface-related multiples. As depicted in FIG. 4, magnetic fields are measured (at 402) with a sensor module 110 (FIG. 1) for a source (transmitter 102) at orientations I and II. In accordance with some examples, the magnetic fields measured by the sensor modules 110 include magnetic fields that are tangential to the seabed 104 (in other words, horizontal magnetic fields). At the observation plane 202, up-going and down-going EM wavefields are determined (at 404) for the measured magnetic fields according to orientations I and II.

The analysis software 188 then identifies (at 406) the incident wavefield $\hat{E}^i(x|x^{Sr})$ for state B. The analysis software 118 then applies (at 408) the reciprocity theorem to define relationships between EM wavefields and states A in B, where the relationship is expressed as a system of equations. The system of equations relates EM fields in state A to EM fields in state B for up-going and down-going EM wavefields for orientation I, and relates EM fields in state A and EM fields in state B for orientation II (such as in Eqs. 7A-7B and 8A-8B).

The analysis software 188 then solves (as 410) to system of equations for the unknown wavefield $\hat{E}^r(x|x^{Sr})$. The wavefield $\hat{E}^r(x|x^{Sr})$ is the up-going reflected wavefield in which the ghosting effect and the water-layer multiple effect have been removed to provide an accurate representation of the subterranean structure from which an accurate survey can be performed.

Eqs. 7A-7B above may be simplified in some conditions. In a first simplified example, the EM source is a horizontal electric dipole in the $x_1$-direction with electric moment $\hat{m}_1^e$. Basically, a horizontal electric dipole is a source that includes two wires extending in a horizontal orientation (e.g., $x_1$-direction). In this case, the magnetic incident field from such a dipole has not component in the $x_1$-direction, which means that Eqs. 7A and 7B can be simplified to:

$$-\frac{1}{2}\hat{m}_1^e E_1^{up,I}(x^{Sr}|x^S) = \iint_{(x_1,x_2)\in R^2} i_3 \cdot [\hat{E}^r(x|x^{Sr}) \times \hat{H}^{down,I}(x|x^S)]dA \quad \text{(Eq. 9A)}$$

$$-\frac{1}{2}\hat{m}_1^e E_1^{up,II}(x^{Sr}|x^S) = \iint_{(x_1,x_2)\in R^2} i_3 \cdot [\hat{E}^r(x|x^{Sr}) \times \hat{H}^{down,II}(x|x^S)]dA \quad \text{(Eq. 9B)}$$

for all $x^S \in R^2$.

Note that in Eq. 9A, $$-\frac{1}{2}\hat{m}_1^e$$

has replaced the $\hat{H}^I(x|x^S)$ value in Eq. 7A, which is possible due to the fact that there is no magnetic incident field in the $x_1$-direction when a horizontal electric dipole is used. A similar substitution is performed in Eq. 9B (with respect to Eq. 7B). After the inversion of this linear system of equations, $\hat{E}_1^r$ and $\hat{E}_2^r$ are derived (which are the electric field $\hat{E}^r$ in the $x_1$ and $x_2$ directions, respectively).

In a second simplification example, a horizontally layered earth model is considered. A horizontal layered earth model refers to a model of the subterranean structure where layers in the subterranean structure are relatively flat such that the layers differ in the vertical $x_3$ direction. Without loss of generality, in this scenario $x^{Sr}$ is equal to $\{0,0, x_3^{Sr}\}$, where it is assumed in the desired state B that the horizontal positions (along $x_1$ and $x_2$) do not contribute to the reflected EM wavefield from the subterranean structure. Further, since the horizontal dependence of the actual wavefield is given in terms of the coordinates $\{x_1-x_1^S, x_2-x_2^S\}$, Eq. 6 may be replaced by:

$$\iint_{(x_1,x_2)\in R^2} i_3 \cdot [\hat{E}^{up}(x_1-x_1^S, x_2-x_2^S, x_3^{obs}|0,0,x_3^S) \times \quad \text{(Eq. 10)}$$
$$\hat{H}^i(x_1,x_2, x_3^{obs}|0,0,x_3^{Sr})]dA =$$
$$\iint_{(x_1,x_2)\in R^2} i_3 \cdot [\hat{E}^r(x_1, x_2, x_3^{obs}|0,0,x_3^{Sr}) \times$$
$$\hat{H}^{down}(x_1-x_1^S, x_2-x_2^S, x_3^{obs}|0,0,x_3^S)]dA.$$

For convenience, all quantities are transformed to the two-dimensional spatial Fourier domain, using the transform pair, $$\tilde{u}(k_1, k_2, x_3) = \iint_{(x_1,x_2)\in R^2} \exp(jk_1 x_1 + jk_2 x_2)\hat{u}(x_1, x_2, x_3)dA, \quad \text{(Eq. 11A)}$$

$$\hat{u}(x_1, x_2, x_3) = \quad \text{(Eq. 11B)}$$
$$\frac{1}{(2\pi)^2} \iint_{(k_1,k_2)\in R^2} \exp(-jk_1 x_1 - jk_2 x_2)\tilde{u}(k_1, k_2, x_3)dA,$$

where j denotes the imaginary unit and $\{k_1, k_2\}$ denote the two-dimensional transform parameters. In view of the correlation theorem, Eq. 10 transforms to $$i_3 \cdot [\tilde{E}^{up}(-k_1, -k_2) \times \tilde{H}^i(k_1, k_2)] = i_3 \cdot [\tilde{E}^r(k_1, k_2) \times \tilde{H}^{down}(-k_1, -k_2)], \quad \text{(Eq. 12)}$$

where $$\tilde{E}^r(k_1, k_2) = \tilde{E}^r(k_1, k_2, x_3^{obs}|0,0,x_3^{Sr}),$$

$$\tilde{H}^i(k_1, k_2) = \tilde{H}^i(k_1, k_2, x_3^{obs}|0,0,x_3^{Sr}),$$

$$\tilde{E}^{up}(-k_1, -k_2) = \mathrm{E}^{up}(-k_1, -k_2, x_3^{obs}|0,0,x_3^S),$$

$$\tilde{H}^{down}(-k_1, -k_2) = \mathrm{H}^{down}(-k_1, -k_2, x_3^{obs}|0,0,x_3^S).$$

Again, two independent measurements are obtained by taking two different EM source excitations, denoted by I and II. Then, for each value of $\{k_1, k_2\}$, a system of two equations for the two unknowns $\mathrm{E}_1^r$ and $\mathrm{E}_2^r$ is derived, as follows:

$$\begin{pmatrix} -\tilde{E}_2^{up,I}(-k_1,-k_2) & \tilde{E}_1^{up,I}(-k_1,-k_2) \\ -\tilde{E}_2^{up,II}(-k_1,-k_2) & \tilde{E}_1^{up,II}(-k_1,-k_2) \end{pmatrix} \begin{pmatrix} \tilde{H}_1^i(k_1,k_2) \\ \tilde{H}_2^i(k_1,k_2) \end{pmatrix} = \quad \text{(Eq. 13)}$$
$$\begin{pmatrix} \tilde{H}_2^{down,I}(-k_1,-k_2) & -\tilde{H}_1^{down,I}(-k_1,-k_2) \\ \tilde{H}_2^{down,II}(-k_1,-k_2) & -\tilde{H}_1^{down,II}(-k_1,-k_2) \end{pmatrix} \begin{pmatrix} \tilde{E}_1^r(k_1,k_2) \\ \tilde{E}_2^r(k_1,k_2) \end{pmatrix}.$$

After inversion of this system, $\mathrm{E}_1^r$ and $\mathrm{E}_2^r$ are derived. Subsequently, a two-dimensional inverse Fourier transformation is applied to the spatial domain. This yields the horizontal field components, $\hat{E}_1^r(x_1, x_2, x_3^{obs}|0,0, x_3^{Sr})$ and $\hat{E}_2^r(x_1, x_2, x_3^{obs}|0,0, x_3^{Sr})$, of the multiple-free wavefield in the spatial domain.

Further simplification can be accomplished if a horizontal electric dipole is used. When dealing with the particular case for a measurement setup (orientation I) in a horizontally layered medium, where the wavefields are generated by a horizontal electric dipole in the $x_1$-direction, it is observed that a second measurement II) may be superfluous and unnecessary. Normally, measurement II is created by rotating the source such that the wavefields are generated by a horizontal electric dipole in the $x_2$-direction. However, the wavefields in measurement setup Ii are directly obtained from the measurements of setup I, by taking $E_1^{up,II}=-E_2^{up,I}$, $E_2^{up,II}=E_1^{up,I}$, $H_1^{down,II}=-H_2^{down,I}$ and $H_2^{down,II}=H_1^{down,I}$.

In yet another simplification, if in the horizontally layered configuration the desired EM field is generated by a vertical electric dipole source, it is known that the desired wavefield only includes TM wave constituents with zero vertical magnetic field component. In this case, the horizontal components $\{E_1^r, E_2^r\}$ of the desired field can be expressed in terms of the vertical component $E_3^r$ of the desired field, as follows:

$$\tilde{E}_1^r = -\frac{k_1(\omega^2\hat{\varepsilon}\mu - k_1^2 - k_2^2)^{\frac{1}{2}}}{k_1^2 + k_2^2}\tilde{E}_3^r, \quad \text{(Eq. 14)}$$

$$\tilde{E}_2^r = -\frac{k_2(\omega^2\hat{\varepsilon}\mu - k_1^2 - k_2^2)^{\frac{1}{2}}}{k_1^2 + k_2^2}\tilde{E}_3^r$$

Therefore, Eq. 12 may be rewritten as an equation for the vertical electric field component, $E_3^r$, of the desired wavefield only. Hence, for a horizontally layered earth model, it is observed that one set of measurements is sufficient to uniquely determine the multiple-free reflected wavefield.

Similarly, if in the horizontally layered configuration the desired field is generated by a vertical magnetic dipole source, it is known that the desired wavefield only includes TE wave constituents with zero vertical electric field component. In this case, the horizontal components $\{E_1^r, E_2^r\}$ of the desired field can be expressed in terms of the vertical component $H_3^r$ of the desired field, as follows:

$$\tilde{E}_1^r = \frac{\omega\mu k_2}{k_1^2 + k_2^2}\tilde{H}_3^r, \quad \tilde{E}_2^r = \frac{\omega\mu k_1}{k_1^2 + k_2^2}\tilde{H}_3^r \quad \text{(Eq. 15)}$$

therefore, Eq. 12 may be rewritten as an equation for the vertical magnetic field component, $H_3^r$, of the desired wavefield only. Hence, for a horizontally layered earth model, it is observed that one set of measurement is enough to uniquely determine the multiple-free reflected wavefield.

The general case is further discussed below, where in the general case the earth is not horizontally layered. Since the results of the decomposition of the actual wavefield are arrived at in the spatial Fourier domain, it may be convenient to solve the removal equation in the two-dimensional spatial Fourier domain. Using Parseval's theorem, Eq. 6 is replaced by:

$$\iint_{(k_1,k_2)\in R^2} i_3 \cdot \begin{bmatrix} \tilde{E}^{up}(-k_1,-k_2,x_e^{obs}|x^S) \times \\ \tilde{H}^i(k_1,k_2,x_3^{obs}|x^{Sr}) \end{bmatrix} dA = \quad \text{(Eq. 16)}$$

$$\iint_{(k_1,k_2)\in R^2} i_3 \cdot \begin{bmatrix} \tilde{E}^r(k_1,k_2,x_3^{obs}|x^{Sr}) \times \\ \tilde{H}^{down}(-k_1,-k_2,x_3^{obs}|x^S) \end{bmatrix} dA$$

Similarly, Eqs. 7A, 7B can be replaced in the two-dimensional spatial Fourier domain.

Alternatively, the tangential components of the electric and magnetic fields can be expressed in terms of the vertical components, which leads to:

$$\iint_{(k_1,k_2)\in R^2} \frac{1}{k_1^2+k_2^2}[\hat{\varepsilon}\tilde{E}_3^i\partial_3\tilde{E}_3^{up} + \mu\tilde{H}_3^{up}\partial_3\tilde{H}_3^i]dA = \quad \text{(Eq. 17)}$$

$$\iint_{(k_1,k_2)\in R^2} \frac{1}{k_1^2+k_2^2}[\hat{\varepsilon}\tilde{E}_3^{down}\partial_3\tilde{E}_3^r + \mu\tilde{H}_3^r\partial_3\tilde{H}_3^{down}]dA,$$

where $\tilde{E}_3^i\tilde{E}_3^i(k_1,k_2,x_3^{OBS}|x^{Sr}), \tilde{H}_3^i=\tilde{H}_3^i(k_1,k_2,x_3^{obs}|x^{Sr})$, $\tilde{E}_3^r=\tilde{E}_3^r(k_1,k_2,x_3^{obs}|x^{Sr}), \tilde{H}_3^r=\tilde{H}_3^r(k_1,k_2,x_3^{obs}|x^{Sr})$, $\tilde{E}_3^{up}=\tilde{E}_3^{up}(-k_1,-k_2,x_3^{obs}|x^S), \tilde{H}_3^{up}=\tilde{H}_3^{up}(-k_1,-k_2,x_3^{obs}|x^S)$, $\tilde{E}_3^{down}=\tilde{E}_3^{down}(-k_1,-k_2,x_3^{obs}|x^S)$,
$\tilde{H}_3^{down}=\tilde{H}_3^{down}(-k_1,-k_2,x_3^{obs}|x^S)$.

Note that the $E_1$ and $E_2$ components have been removed from Eq. 17, so that a single equation for the unknown $\partial_3 E_3^r$ and $H_3^r$ results.

In the special case, where a horizontally layered earth model is assumed, the TE and TM waves are uncoupled and, for each spectral value $\{k_1, k_2\}$, the solution is arrive at:

$$\tilde{E}_3^r = \frac{\tilde{E}_3^{up}}{\tilde{E}_3^{down}}\tilde{E}_3^i \text{ for } TM\text{-waves}, \quad \text{(Eq. 18)}$$

$$\tilde{H}_3^r = \frac{\tilde{H}_3^{up}}{\tilde{H}_3^{down}}\tilde{H}_3^i \text{ for } TE\text{-waves}.$$

In the general case, two equations are used. This is achieved by completing a set of measurements with two different types of EM sources, such that, in the actual configuration, both transversal electric (TE) and transversal magnetic (TM) waves are present. In the desired configuration, the type of EM source can be freely chosen. In particular, a first choice of the desired configuration will be one with a vertical magnetic dipole source. In this desired configuration mainly TE waves will occur, while TM waves only arise if lateral changes of the subsurface are present. Alternatively, a second choices of the desired configuration will be one with a vertical electric dipole source. Then, mainly TM waves will occur, while TE waves only arise if lateral inhomogeneities of the subsurface are present. This procedure facilitates an enhanced interpretation of the "multiple-free" field data, especially the EM signals due to the lateral changes of the domain under investigation.

Instructions of software described above (including the analysis software 118 in FIG. 1) are loaded for execution on a processor (e.g., CPU 120 in FIG. 1). The processor includes microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the software) are stored in respective storage devices (such as storage 122 in FIG. 1), which are implemented as one or more machine-readable storage media. The storage media include different forms of memory including semiconductor memory device such as dynamic or static random access memories (DRAMs or SRAMs), erasable and programmable read-only memories (EPROMs), electrically erasable and programmable read-only memories (EEPROMs) and flash memories, magnetic disks such s fixed, floppy and removable disks; other magnetic media including tape; and optical media such as compact disks (CDs) or digital video disks (DVDs).

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method of performing surveying of a subterranean structure, comprising:
   determining electromagnetic (EM) wavefields traveling in opposite directions;
   defining a relationship among the EM wavefields, wherein the EM wavefields include a first set of EM wavefields in a first state in which a sea surface is present, and a second set of EM wavefields in a second, different state in which the sea surface is not present, wherein the first set of EM wavefields comprises EM wavefields traveling in opposite directions, and wherein the second set of EM wavefields comprises EM wavefields traveling in opposite directions;
   receiving measurements in response to: (1) EM wavefields produced by an EM transmitter at plural different orientations; or (2) EM wavefields produced by different types of EM transmitters; and
   according to the measurements, solving for at least one EM wavefield in the relationship to perform removal of sea surface-related effects.

2. The method of claim 1, wherein solving for the at least one EM wavefield comprises solving for a reflected wavefield that is reflected from the subterranean structure.

3. The method of claim 2, wherein solving for the reflected wavefield comprises solving for the reflected wavefield with ghosting and multiples removed.

4. The method of claim 1, wherein defining the relationship comprises defining a relationship according to an EM reciprocity theorem.

5. The method of claim 1, wherein the first set of EM wavefields in the first state comprises up-going and down-going EM wavefields traveling generally in a vertical direction, the method further comprising the up-going and down-going EM wavefields based on the measurements.

6. The method of claim 5, wherein the second set of EM wavefields in the second state comprise the at least one EM wavefield being solved and an incident EM wavefield from a corresponding one of the EM transmitters, wherein the at least one EM wavefield comprises a reflected EM wavefield reflected from the subterranean structure.

7. The method of claim 1, further comprising simplifying the defined relationship among the EM wavefields by representing the subterranean structure as a horizontally layered earth module.

8. A method of performing surveying of a subterranean structure, comprising:
   determining electromagnetic (EM) wavefields traveling in opposite directions;
   defining a relationship among the EM wavefields, wherein the EM wavefields include a first set of EM wavefields in a first state in which a sea surface is present, and a second set of EM wavefields in a second, different state in which the sea surface is not present;
   solving for at least one EM wavefield in the relationship to perform removal of sea surface-related effects;
   simplification the define relationship among the EM wavefields when an EM source comprises one of a horizontal electric dipole, a vertical electric dipole, and a vertical magnetic dipole; and
   determining the first set of the EM wavefields based on measurements by a sensor module in response to EM signals from the EM source.

9. An article comprising at least one storage medium containing instructions that when executed cause a system to:
   receive measurement data obtained by a sensor module in response to: (1) electromagnetic (EM) wavefields from a transmitter at plural orientations; or (2) EM wavefields from different types of EM transmitters;
   produce up-going and downgoing EM wavefields according to the measurement data, the up-going and down-going EM wavefields representing EM wavefields in a first state where a sea surface is present;
   provide an incident EM wavefield and a reflected EM wavefield for a second state where the sea surface is not present; and
   solve for the reflected EM wavefield according to a relationship among the up-going and down-going EM wavefields and the incident and reflected EM wavefields, where the reflected EM wavefield that is solved is free of sea surface-related effects.

10. The article of claim 9, wherein the sea surface-related effects include ghosting and multiple reflections, and wherein the reflected EM wavefield is free of ghosting and multiple reflections.

11. The article of claim 9, wherein solving for the reflected EM wavefield comprises solving for the reflected EM wavefield that is reflected from a subterranean structure under a seabed.

12. The article of claim 9, further comprising defining the relationship among the up-going and down-going EM wavefields according to an EM reciprocity theorem.

13. A system to perform surveying of a subterranean structure, comprising:
   at least one transmitter to emit electromagnetic (EM) signals;
   at least one sensor module to provide measurement data in response to: (1) EM wavefields produced by the transmitter at plural different orientations; or (2) EM wavefields produced by different types of EM transmitters; and
   a computer to:
      determine EM wavefields traveling in opposite directions;
      define a relationship among the EM wavefields, wherein the EM wavefields include a first set of EM wavefields in a first state in which a sea surface is present, and a second set of EM wavefields in a second, different state in which the sea surface is not present, wherein the first set of EM wavefields comprises EM wavefields traveling in opposite directions, and wherein the second set of EM wavefields comprises EM wavefields traveling in opposite directions, wherein the first set of EM wavefields is based on the measurement data;

according to the measurement data, solve for at least one EM wavefield in the relationship to perform removal of sea surface-related effects.

14. The system of claim 13, wherein the solved at least one EM wavefield is free of ghosting and water-surface multiples.

15. The system of claim 13, wherein the relationship is according to an EM reciprocity theorem.

16. The system of claim 13, wherein the solved at least one EM wavefield is an EM wavefield reflected from the subterranean structure that is free of water-surface multiples.

* * * * *